United States Patent

[11] 3,597,907

| [72] | Inventor | Archie E. Neal<br>Garfield, Wash. |
|---|---|---|
| [21] | Appl. No. | 432,600 |
| [22] | Filed | Feb. 15, 1965 |
| [45] | Patented | Aug. 10, 1971 |
| [73] | Assignee | J. E. Love Company<br>Garfield, Wash. |

[54] HEADER ELEVATIONAL CONTROL SYSTEM FOR CROP-HARVESTING MACHINE
5 Claims, 1 Drawing Fig.

[52] U.S. Cl. ............................................. 56/208, 56/DIG. 15
[51] Int. Cl. ............................................. A01d 67/00
[50] Field of Search ............................................. 56/208

[56] References Cited
UNITED STATES PATENTS

| 3,163,974 | 1/1965 | Mack | 56/208 |
| 2,750,727 | 6/1956 | Wright | 56/208 |
| 3,163,974 | 1/1965 | March | 56/208 |
| 3,222,851 | 12/1965 | Schnaidt et al. | 56/11 |

*Primary Examiner*—Antonio F. Guida
*Attorney*—Seed, Berry & Dowrey

ABSTRACT: An elevational control system for the header of a crop-harvesting machine wherein the header is pivotally connected to the machine and a hydraulic cylinder is used to vertically position the header. A floating cutting platform is connected to the header and has a ground-engaging portion which acts to yieldably transfer a portion of the weight of the header to the ground. A pressure-responsive switch in the hydraulic system controls the supply of fluid to the cylinder so that a change in the system pressure caused by the header riding too high or too low results in vertical adjustment of the header so as to restore the predetermined load distribution between the hydraulic system and the ground.

Patented Aug. 10, 1971
3,597,907
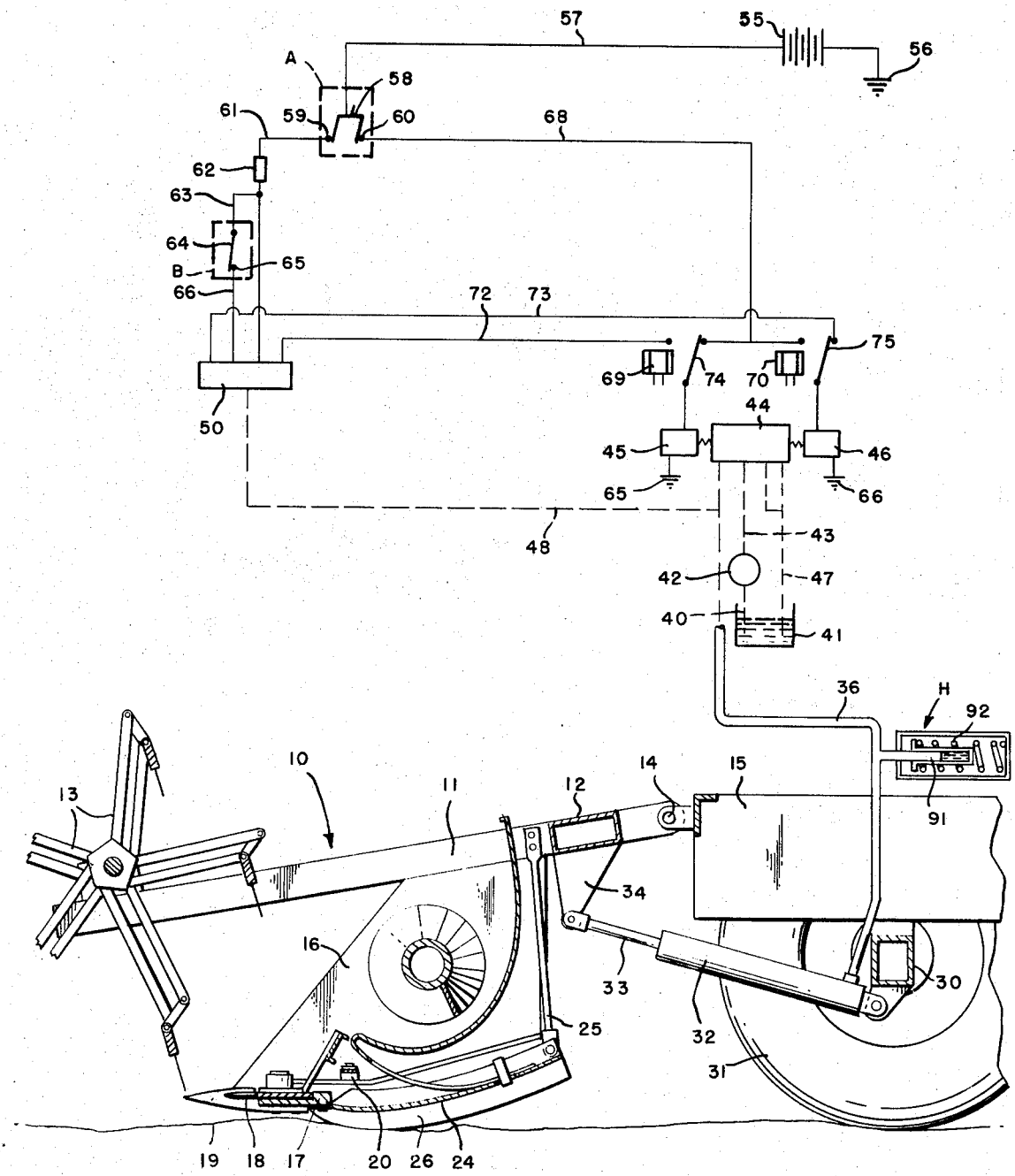
ARCHIE E. NEAL
INVENTOR.
BY Seed & Berry
ATTORNEYS

HEADER ELEVATIONAL CONTROL SYSTEM FOR CROP-HARVESTING MACHINE

This invention relates to improvements in crop harvesting machines, such as combines and the like, as used for the harvesting of grain-producing crops and with machines of those kinds employed for harvesting low growing crops such as soy beans, lentils and peas.

More specifically stated, the present invention resides in the provision of novel and effective means for controlling the elevational adjustments of the header unit during use of a harvesting machine to accommodate or best suit changes in the contour of the ground surface over which the harvester is operating, thus to provide for cutting the maximum amount of foliage without skipping or running the cutting mechanism into the ground.

It is the principal object of the present invention to provide a simple, practical and novel means for effecting header unit elevational adjustment as the harvester travels across a field, as may be required or desired to best satisfy changes of surface contour. Furthermore, to provide means whereby the required header elevational adjustments are obtained in conjunction with the hydraulic cushioning system with which the header unit is or may be equipped.

Further objects and advantages of the present invention reside in the specific arrangements of its parts and in their application and mode of use for their intended purposes.

In accomplishing the above-mentioned and other objects of invention, invention I have provided the improved details of construction, the preferred forms of which are illustrated in the accompanying drawing, which shows a header unit in vertical cross section as associated with the frame structure of a present day combine or other harvesting machine, and which drawing also schematically shows the hydraulic and electrical controls and systems embodied in the present invention and as employed for header unit elevational control.

Referring more in detail to the drawings:

Reference numeral 10 designates, in its entirety, the header unit of a harvester such as a typical combine, to which the present invention has been applied as for use. The header unit 10 as herein shown, comprises a rigid substantially horizontal top frame structure having opposite end beams such as that designated at 11, that are rigidly joined across their rear ends by a beam 12, and which at their forward ends, mount the conventional feeder or beater reel 13 between them. At their rear ends, the opposite end beams 11 of the top frame are pivotally mounted, as at 14 on the front end member of the main frame structure 15 of the combine, thus to permit the elevational adjustment of the header unit as may be required or desired.

Fixed rigidly to the opposite end beams 11, medially of their ends, are paired, downwardly directed plates 16, 16, which between them confine the cutting platform 17 on which the crop cutting sickle 18 of the header is reciprocally mounted; this sickle, which is of the usual mower type, is associated with the platform 17 as equipped with the usual forwardly directed guard teeth 19 and is reciprocally driven by a driving rod 20 as in most headers of similar type.

The sickle-carrying platform 17 is confined lengthwise of and between the opposite end plates 16 as applied to the frame and beams 11.

For the cutting of low growing crops, it is desirable that the header unit 10 shall ride on or close to the ground surface without ground gouging. This is virtually impossible if its elevational adjustments must be manually effected. The present invention anticipates making such adjustments by the means now to be described, which allows the header unit 10 to contact the ground but to transfer only a minimum amount of its weight thereto.

It has been disclosed that the cutting platform 17 is confined between the opposite plates 16 of the header frame and is supported at its opposite ends and medially thereof by resilient floating shoe assemblies 24 as shown, each of which is pivotally attached at its rear end to a vertical bar 25 that is fixed at its upper end to the header frame structure. The several floating shoes 24 support the cutting platform 17 at their outer or forward ends. Also, each shoe 24 includes a longitudinal, ground-engaging runner 26 that normally lightly rides on the ground rearwardly of the sickle bar 18 to establish the minimum elevation of the cutting platform as the combine moves forwardly across a field.

Pivotally fixed to the cross-axle 30 of the frame of the harvester, which at its opposite ends mounts the carrying ground wheels 31 of the front end portion of frame 15, are paired laterally spaced hydraulic cylinders 32 with piston rods 33 extended forwardly therefrom and pivotally attached at their forward ends to downwardly directed laterally spaced brackets 34 that are rigidly fixed to the crossbeam 12 that joins the opposite end beams 11 of the header frame. It is to be understood that when hydraulic pressure medium is applied through a pressure line 36 to the cylinders 32 as presently explained to extend the piston rods 33, the header frame will be lifted at its forward end accordingly. Thus, by a controlled application of pressure medium to the cylinders 32, the desired elevational adjustment of the header unit 10 may be effected, and regulated.

It has been shown in the schematic portion of the present drawing, that a pipeline 40 leads from a hydraulic reservoir or tank 41 of hydraulic pressure medium to a driven pump 42 that is operable to forcibly deliver the pumped medium through a pipe connection 43 to a solenoid-operated valve 44 with which, at its opposite ends, solenoids 45 and 46 are applied for valve control. Also, it has been shown that the pressure pipeline 36 leads from valve 44 to the cylinders 32 and that the valve 44 has a return pipe connection 47 leading therefrom to tank 41. The pipeline 36 also has a pressure pipe connection 48 heading therefrom to a pressure-sensitive switch 50.

Pressure-sensitive switch may be of any suitable kind, for example, a Barksdale Pressure Switch, Model C9622, which embodies two microswitches, that may be adjusted for high and low limits.

The electrical system embodied in this invention includes a battery 55, which may be that of the harvesters powerplant; the battery being grounded at one side, as at 56, and with a circuit line 57 leading from its opposite side to the switch arm 58 of a double pole switch A, with contacts 59 and 60 connected by switch arm 58.

Leading from the contact 59 is a circuit line 61 leading through a protective fuse 62 and circuit connection 63 to the arm 64 of a single pole switch B with its contact 65 joined by a circuit connection 66 with one of the microswitches of the pressure-sensitive switch 50.

From the contact 60 of the switch A, a circuit line 68 leads to one side of each of two relay switches 69 and 70 associated with the solenoids 45 and 46.

It is also shown that the pressure-sensitive switch 50 has circuit line connections 72 and 73 leading from the microswitches in switch 50, respectively, to the relays 69 and 70 which have their armatures 74 and 75 connected, respectively, to the solenoids 45 and 46.

Assuming the parts to be assembled and operatively associated with the harvester and as indicated in the drawing, it will be understood that the header unit 10 will be advanced by and forwardly of the combine, with the cutting platform 17 supported yieldingly by and lightly by the shoes 24, at the ground-engaging elevation as shown. Usually the shoes 24 are applied to the cutting platform to support it at an operating level that is quite close to ground surface. However, elevational adjustment of the cutting platform may be determined by the setting of the pressure-sensitive switch 50. Any increasing by pump 42 of the pressure of hydraulic medium in pipeline 36 and in cylinders 32 extends the piston rods 33 to lift the header unit 10 upwardly at its forward end accordingly. This elevational adjustment is controlled in the present instance by the setting of the pressure-sensitive switch 50 which is subjected to the pressure medium as applied thereto through valve 44 and into the pipeline 48. Excess of hydraulic medium supplied by the pump through valve 44 is returned from valve 44 through line 47 to storage tank 41.

If the pump 42 supplies an excess of pressure medium in line 36 and cylinders 32 for maintaining the desired cutter elevational adjustment, the pressure-sensitive switch 50 will be automatically actuated to actuate either one or the other of the microswitches of the valve 50 to energize the proper relay 69 or 70, to energize its companion solenoid 45 or 46 and to make a proper adjustment of valve 44 to reestablish the necessary pressure in pipeline 36 for the desired header elevation position.

It is to be noted that a header cushioning unit H is mounted on the combine frame 15; this includes a piston 91 contained in a spring-pressured cylinder 92 that acts against pressure medium in the pipeline 36 to counteract shock loads in the pipeline 36 and hydraulic cylinders 32, thus to cushion the normal shock in the pressure system.

It is further to be understood that when the hydraulic cylinders 32 are carrying the header at a predetermined high level, pressure in the hydraulic line 36 is correspondingly high. When the header is resting on the ground, as shown, pressure in that line is at a minimum. The present header control system monitors this pressure according to the setting of switch 50 and so controls it that neither pressure extreme is reached.

What I claim as new is:

1. In a crop-harvesting machine of the character described having a header unit adjustable for elevation relative to the surface over which the machine travels, said header unit including a floating cutting platform mounted to yieldably engage the ground to transfer a predetermined portion of the weight of the header to the ground, means for establishing and for varying said elevational adjustment during travel of the machine comprising; a hydraulic power cylinder mounted on the machine and having an operative connection with said header unit through which its adjustments are made and maintained in accordance with increase and decrease in the pressure medium applied to said cylinder, a pressure medium supply line under valve control leading to said cylinder, and control means including a fluid pressure-sensitive switch operable under control of pressure medium as supplied thereto for controlling the supply of pressure medium to said cylinder responsive to the fluid pressure in said supply line to maintain the desired elevation of the header.

2. In a crop-harvesting machine of the character described having a header unit adjustable for elevation relative to the surface over which the machine travels, said header unit including a floating cutting platform mounted to yieldably engage the ground to transfer a predetermined portion of the weight of the header to the ground, means for varying elevational adjustment of said header unit comprising; a hydraulic power cylinder mounted on the machine and having operative connection with said unit for its elevational adjustment in accordance with the supply of pressure medium delivered to said cylinder, a pressure medium supply line, a solenoid-operated valve for controlling the supplying of fluid pressure medium from said supply line to said cylinder, and a pressure-sensitive switch operable by the fluid pressure of medium supplied to said cylinder for controlling the supply of pressure medium to said cylinder to maintain the desired elevation of the header.

3. Mechanism according to claim 2 wherein the pressure medium is supplied to said power cylinder through a pipeline, and wherein a pressure-cushioning cylinder is mounted on said harvesting machine, to which the pressure medium is admitted to actuate a spring-loaded piston whereby shock loads in the pressure line and power cylinder are absorbed.

4. Apparatus according to claim 2 wherein said harvesting machine has a frame structure and said header unit is pivotally supported therefrom and forwardly thereof for vertical elevational adjustment about its pivotal mounting and wherein the hydraulic pressure medium is supplied to said hydraulic cylinder, through a supply line under control of said solenoid-operated valve, and wherein said pressure-sensitive switch is supplied with actuating pressure medium supplied thereto through a pipe connection with the supply line leading from said valve to power cylinder.

5. Apparatus according to claim 4 wherein solenoids act on said solenoid valve for its opening and closing actions and are selectively energized by operation of circuits established at high and low setting of the pressure-sensitive switch.